Jan. 19, 1937.  L. M. HARVEY  2,068,024
FRUIT CLIPPER
Filed June 16, 1934  2 Sheets-Sheet 1
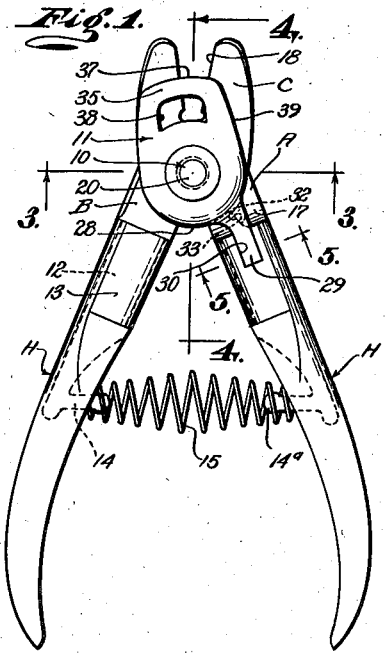
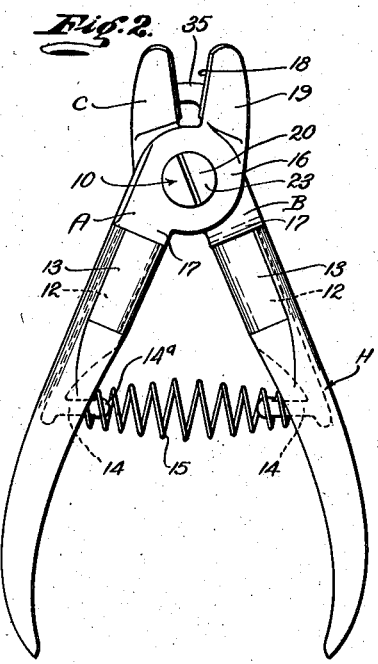
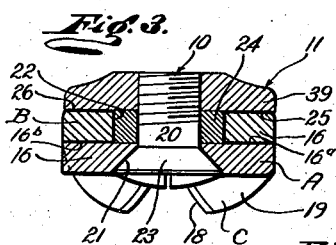
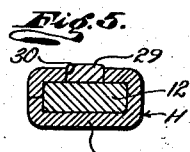
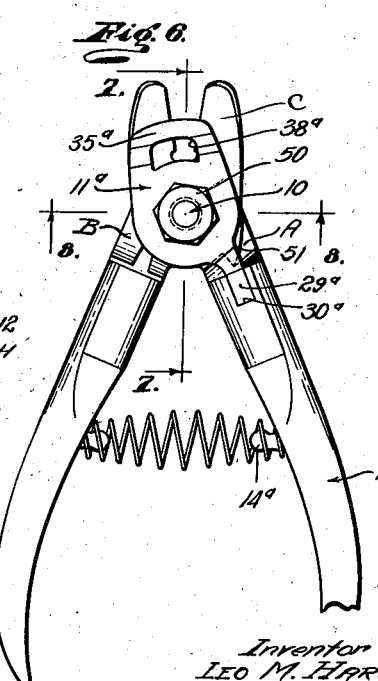
Inventor
LEO M. HARVEY
By
His Attorney Jan. 19, 1937.    L. M. HARVEY    2,068,024
FRUIT CLIPPER
Filed June 16, 1934    2 Sheets-Sheet 2
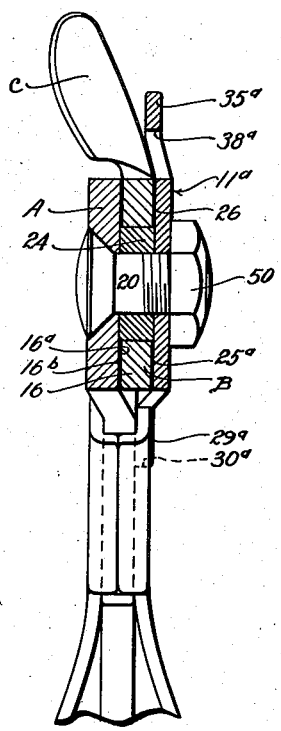
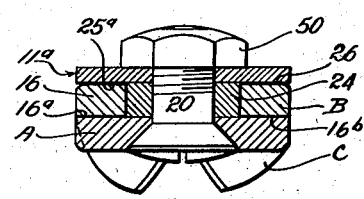
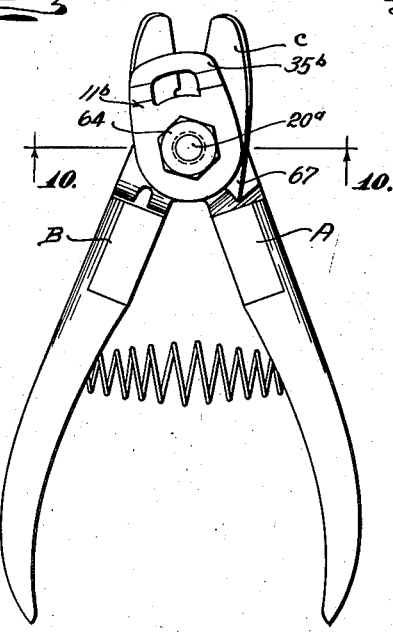
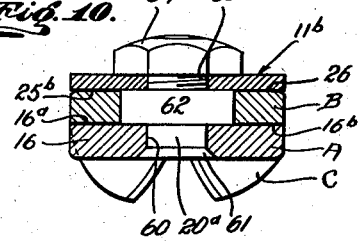
Inventor
Leo M Harvey
By
His Attorney

Patented Jan. 19, 1937

2,068,024

UNITED STATES PATENT OFFICE 2,068,024

FRUIT CLIPPER

Leo M. Harvey, Los Angeles, Calif.

Application June 16, 1934, Serial No. 730,969

4 Claims. (Cl. 30—24)

This invention relates to clippers and relates more particularly to fruit clippers for cutting fruits from their stems. It is a general object of the invention to provide effective and improved fruit clippers.

The fruit clippers employed in the harvesting of citrus fruits, etc. must have certain capabilities and characteristics to be effective and commercially practical. For example, the jaws of fruit clippers must be shaped to extend or fit into the depression in the fruit, usually present around the stem, to cut the stem at a point close to the fruit so that no projecting stem remains on the fruit to puncture or abrade the skins of other fruit. Another important factor is to pivotally connect the jaw members of the clippers in a manner so that the jaws will properly cooperate in cutting the fruit stems and so that the clippers will not work loose though use. The jaws, in order to fit into the depressions of the fruit to cut the stems as short as possible must be curved or otherwise shaped so that their active edges or cutting edges operate in planes spaced from the plane of the pivotal connection between the jaw and handle members of the clippers. Due to this formation and location of the stem cutting parts with respect to the pivotal connection the actual severing or cutting of the stems tends to rock or twist the members of the clippers and imposes severe strains and wear on the parts of the pivotal connection. Fruit clippers must be small and compact to be held in one hand and to be conveniently manipulated in the picking of the fruit. Accordingly, the parts of the pivotal connection must be rather small. The pivotal connections of the fruit clipper heretofore introduced have not been designed to withstand the lateral rocking or twisting mentioned above and the other strains to which they are subjected. In most instances the clippers that have been introduced have common nuts or washers and nuts on their pivot pins which do not present sufficiently large bearing surfaces to constrain the jaw members to swing or pivot in a single or common plane. Further the pivotal connections employed in most fruit clippers soon work loose and wear loose so that the jaws do not have proper cooperation.

An object of this invention is to provide fruit clippers embodying a novel and particularly effective pivotal connection, and associated parts that positively constrain the jaw members to move in a common plane without tilting or rocking.

Another object of the invention is to provide fruit clippers in which one jaw member has rigidly connected parts presenting spaced opposed parallel surfaces of large extent surrounding the bearing pin or pivot pin which is rigid with said jaw member, and a second jaw member pivoted or swingable on the pin and having large parallel surfaces on its opposite sides which have sliding or bearing cooperation with the spaced parallel surfaces whereby the two jaw members have relative pivotal movement in a single plane and are positively prevented from rocking or moving in any other plane. The large cooperating bearing surfaces of the jaw members are long wearing and effectively resist rocking or lateral movement of the members which might otherwise be caused by the cutting action of the cupped or curved jaws.

An object of this invention is to provide fruit clippers of the character mentioned including two jaw members, a pin pivotally connecting the members, and a bearing part on the pin presenting one of the spaced bearing surfaces mentioned above for maintaining the members in their proper operative relation, said bearing part projecting over the jaws to engage the stem of the fruit to properly locate it between the jaws, thereby facilitating the proper cutting of the stem.

Another object of the invention is to provide an improved fruit clipper of the character mentioned in which the bearing part and stem-engaging stop forms an effective finger rest for the stem-engaging finger of the picker and constitutes a guard to prevent the picker's fingers from being pinched or otherwise injured.

Another object of the invention is to provide fruit clippers of the character mentioned in which the parts of the pivotal connection are easy to machine and may be accurately finished and proportioned.

Another object of the invention is to provide a fruit clipper involving a novel and effective means for pivotally connecting the jaw members whose setting or adjustment cannot be affected by relative pivotal movement between the jaw members and which cannot work loose.

A further object of the invention is to provide fruit clippers in which the jaw members are particularly simple in shape and formation and are inexpensive of manufacture.

Other objects and features of the invention will be better and more fully understood from the following detailed description of typical preferred forms and applications of the invention, throughout which description reference may be had to the accompanying drawings, in which:

Fig. 1 is a top or plan view of one form of the clippers provided by this invention. Fig. 2 is a bottom view of the clippers. Fig. 3 is an enlarged transverse detailed sectional view taken as indicated by line 3—3 on Fig. 1. Fig. 4 is an enlarged longitudinal detailed sectional view taken as indicated by line 4—4 on Fig. 1. Fig. 5 is an enlarged transverse detailed sectional view taken as indicated by line 5—5 on Fig. 1. Fig. 6 is a top or plan elevation of another form or embodiment of the invention. Figs. 7 and 8 are enlarged sectional views taken as indicated by lines 7—7 and 8—8, respectively, on Fig. 6. Fig. 9 is a top view of still another form of the invention and Fig. 10 is an enlarged detailed sectional view taken as indicated by line 10—10 on Fig. 9.

The form of the invention illustrated in Figs. 1 to 5, inclusive, of the drawings, includes, generally, two members A and B having jaws C, and means 10 for pivotally connecting the members A and B involving a bearing member 11 that forms a stem engaging stop and a rest or guard for the finger of the user.

The jaw carrying members A and B are substantially alike and are complementary to properly cooperate or work together. The members A and B may be constructed or formed as found most desirable. It has been found practical to stamp or forge the members A and B from sheet metal stock. The members A and B include shanks 12 carrying handles H. The handles H are shaped and proportioned to be readily grasped and held by the user. In the particular form of the invention illustrated in the drawings the handles H are U-shaped or channel shaped in cross section and have curved external surfaces which may be suitably roughened or knurled, if desired. The shanks 12 are received in the grooved or open inner sides of the handles H and the side flanges 13 of the handles are wrapped about and clamped onto the shanks 12 to secure the handles to the members A and B. Inwardly projecting lugs or pins 14 are provided on the end portions of the shanks 12. A spiralled spring 15 is arranged under compression between the shanks 12 to normally hold the members A and B in the position where the jaws are open and to normally return the members to this position after use. The pins 14 extend into the opposite ends of the spring 15 to retain the spring in position. Heads 14ª are provided on the ends of the pins to prevent displacement of the spring 15.

In accordance with the invention the members A and B are each provided with a broadened intermediate portion 16. The portions 16 of the members A and B have flat inner surfaces 16ª and 16ᵇ, respectively, of substantial area, that are adapted to bear one against the other. The portions 16 are laterally offset from the shanks 12 as at 17, the portions 16 being offset in opposite directions whereby their inner sides may be in proper cooperation and the shanks may lie in substantially the same plane. The outer sides or surfaces of the portions 16 are flat and substantially parallel. The edges of the broadened portions 16 are substantially concentrically curved about a common central point.

The cutting blades or jaws C project forwardly from the broadened portions 16 of the members A and B at points diametrically or diagonally opposite the shanks 12. In the preferred construction the jaws C are integral continuations of the portions 16. The jaws C are adapted to cooperate to cut the stems of the fruit and in accordance with the invention are shaped to extend into the depressions or recesses that occur in the fruit around their stems, whereby the clippers are adapted to cut the stems immediately adjacent the calyces, without bruising or injuring the fruit. The blades or jaws C are curved both transversely and longitudinally. As illustrated in the drawings the jaws C are transversely curved downwardly and inwardly to their cutting edges 18 and are curved downwardly and forwardly to their outer ends. The outer ends of the jaws C are curved upwardly and are blunt so that they have no tendency to cut into or bruise the fruit. The lower surfaces 19 of the jaws C are smooth and rounded. The cutting edges 18 follow, generally, the longitudinal curvature of the inner edge portions of the jaws. The jaws C shaped as just described form an assembly that is cupped and adapted to readily fit into the recess that occurs in the fruit around its stem.

The means 10 for pivotally connecting the members A and B is a feature of the invention and includes a pivot pin 20. In the form of the invention being described the pivot pin is in the form of a screw. The screw 20 passes through an opening 21 in the portion 16 of the member A and an aligned opening 22 in the portion 16 of the member B. The head 23 of the screw 20 has a frusto-conical base and the opening 21 is tapered to receive the head. The outer side of the head is slotted for engagement by a screw driver or the like and may be rounded as illustrated. The opening 22 is larger in diameter than the screw 20 to receive a bearing or bushing 24. The bushing 24 is, of course, supported on the screw 20 and pivotally carries the jaw member B. The opposite ends of the bushing 24 are flat and are parallel with each other and preferably extend slightly beyond the opposite sides of the portion 16 of the member B for the purpose to be subsequently described.

The means 10 for pivotally connecting the members A and B includes the brace member and bearing member 11 provided on the screw 20 to maintain the members A and B in their proper relation. In the form of the invention illustrated in Figs. 1 to 5, inclusive, of the drawings, the bearing part 11 is in the form of a nut and is threaded on the screw 20 so that its inner side 25 opposes and cooperates with the outer surface 26 on the portion 16 of the member B. The inner side 25 of the bearing member is of large area to have extensive cooperation with the surface 26. The cooperation of the surfaces 25 and 26 holds the members A and B in their proper relative positions and together with the cooperation of the surfaces 16ª and 16ᵇ prevents excessive lateral play between the members and constrains the members to move in a single plane. The screw 20 may be tightly threaded into the bearing member 11 without affecting the freedom of pivotal movement of the members A and B as the inner side 25 of the bearing member clamps against the end of the bushing 24 and does not bind against the member B. The bushing thus acts as a spacer. The engagement of the member 11 with the bushing prevents or tends to prevent turning of the member on the screw. The outer surface of the bearing member 11 is preferably smooth and may curve or taper away from its central portion. The outer end of the screw 20 is preferably flush with the outer surface of the bearing member 11. In the preferred construction the lower peripheral edge 28 of the nut or bearing member 11 is concentrically curved about the pivotal axis of the clippers.

The invention provides novel means for locking the nut or bearing member 11 against turning relative to the section A. A projection or lug 29 is provided on the bearing member to fit into or cooperate with a notch 30 in the member A. In the particular construction illustrated in the drawings the notch 30 is provided in the inner end of the handle H on the member A. It will be apparent how the cooperation of the lug 29 with the notch 30 rigidly connects the bearing member 11 with the member A and positively prevents turning of the bearing member with respect to the member A. The head 23 of the screw 20 fits in the tapered opening 21 to constrain the screw to remain stationary relative to the member A, while the lug 29 cooperating with the notch 30 holds the bearing member 11 against movement relative to the member A so that there is no possibility of the pivotal connection working loose. The bushing 24 supports the member B for pivotal movement on the screw 20 so that the pivotal connection cannot bind or loosen during normal operation of the clippers.

Stop means is provided for limiting the relative outward or opening movement of the members A and B. In the form of the invention illustrated in Figs. 1 to 5, inclusive, of the drawings, a lug 28 is provided on the edge portion 16 of the member B and has a radial face 32 adapted to engage a similar face 33 on the lug 29 when the jaws are moved to their spread or open positions by the spring 15. The bearing member 11 thus serves another function, namely that of cooperating with the face 32 on the member B to limit the relative pivotal movement between the members.

The nut or bearing member 11 includes or is provided with a stop 35 projecting forwardly over the jaws C to engage the stem to stop or position it for cutting by the jaws. The stop is an integral continuation of the member 11 and its upper surface is preferably flush with the outer surface of the member 11 whereby the member and stop form an effective finger rest. In practice the stop 35 may be thickened at its underside as at 36. The outer end 37 of the stop 35 is spaced a considerable distance inwardly from the outer ends of the jaws C to engage the stems of the fruit and position them for effective engagement by the cutting edges 18 of the jaws. The stem engaging edge 37 may be straight; however, it may be preferred to curve the edge 37 about the pivotal axis of the clippers. An opening 38 is provided in the stop 35 to allow for the clearance and drainage of juice and sap from between the stop and jaws. The opposite side edges 39 of the stop 35 may be substantially flush with the converging edges of the jaws C when the jaws are in their closed or cutting positions. With the jaws in their closed positions the stop 35 fully overlies the inner portions of the jaws.

It is believed that the utility and practicability of the fruit clippers illustrated in Figs. 1 to 5, inclusive, will be readily understood from the foregoing detailed description. In use the clipper is grasped or held in the inner side of the hand so that its cutting jaws C project forwardly and laterally from the extended pointer finger. In practice a band of leather or the like may be employed to facilitate the connection of the clipper with the hand of the user. The extended first finger or pointer finger is often employed to locate and engage the stems of the fruit and the upper side of the bearing member 11 and its stop 35 form a comfortable and convenient rest for the finger. Further the member 11 prevents the finger or hand of the picker from being pinched or cut by the jaws C. In picking the fruit the stems may be contacted by the extended finger and guided between the jaws C. The outer edge 37 of the stop 35 engages the stems to position them for cutting by the jaws. The pivoting together of the jaws of course cuts a stem that may be extending between the jaws.

The extensive cooperation of the surfaces 16a and 16b and the surfaces 25 and 26 prevents wobbling or lateral play between the members A and B and causes the jaw members to pivot in a common plane. The bushing 24 presents a peripheral surface of comparatively large diameter for pivotally supporting the member B. Operation or pivoting of the member B on the bushing 24 has no tendency to turn the screw 20 or to wear the screw. As described above, the screw 20 is effectively locked against unthreading or loosening from the bearing member 11. The head 23 of the screw is fitted in the tapered opening 21 so that the screw is caused to turn with the member A. The member 11 is also made to turn with the member A because of its clamping engagement with the bushing 24 and through the cooperation of the lug 29 with the notch 30. As both the screw and bearing member 11 turn with the member A the nut does not become loosened or unthreaded from the screw. The bearing member 11 connected with the member A as described may be considered a continuation of the member A, the member A thus having two spaced side parts 11 and 16 between which the portion 16 of the member B moves. The inner sides 25 and 16a of these rigidly connected parts 11 and 16 of the member A are smooth, parallel and of large area and the opposite sides 26 and 16b of the member B are likewise flat and parallel and of large extent so that their cooperation with the surfaces 25 and 16a prevents play or wobble in the clippers and at all times maintains the members in their proper relation. As distinguished from clippers having forged connected side parts on one jaw member with rough and uneven surfaces resulting from the forging operations, the connected side parts 11 and 16 of the member A have smooth parallel inner surfaces and are easy to finish. The bearing member 11 embodied in the form of the invention just described operates to maintain the members A and B in their proper relation, forms an effective finger rest and guard, constitutes a stop for positioning the stems of the fruit between the cutting jaws and limits relative pivotal movement between the members.

Figs. 6, 7 and 8 of the drawings illustrate a form of the invention in which the bearing member 11a is arranged on the pin or screw 20 and is clamped between the bushing 24 and a nut 50 threaded on the screw. The bearing member 11a is in the form of a washer or plate whose inner side constitutes a large bearing surface 25a spaced from and parallel with the surface 16a of the jaw member A. The surface 25a is of substantially the same extent as the surface 26 of the member B with which it cooperates. The nut 50 tightly clamps the bearing member 11a against the end of the bushing 24 to cause it to turn with the body member A and to hold it in its proper position. The bearing member 11a is thus rigidly connected or associated with the jaw member A so that the jaw member A carries or is provided with two spaced parallel surfaces 16a and 25a.

The jaw member B swings or pivots on the bushing 24 between these large parallel bearing surfaces 16a and 25a, and the cooperation of the surfaces 16b and 16a and 26 and 25a causes the jaw members to pivot in a single plane and positively prevents rocking or tilting of the members due to the cooperation of the curved or cupped jaws C.

The bearing member 11a is provided with a stop 35a which projects forwardly over the cupped jaws C to engage the stems of the fruit. The stop 35a may be bent or offset downwardly and may be provided with an opening 38a. The stem engaging stop 35a is a continuation of the bearing member 11a and together with the bearing member forms an effective finger rest and finger guard. A tail or lug 29a may be provided on the bearing member 11a to cooperate with a notch 30a in the member A. The cooperation of the lug 29a with the notch 30a positively prevents movement or turning of the bearing member with respect to the jaw member A.

A stop 51 may be provided on the portion 16 of the jaw member B to cooperate with the lug 29a to limit the relative pivotal movement between the jaw members. The operation of the clippers just described is similar to the operation of the form of the invention illustrated in Figs. 1 to 5, inclusive, of the drawings.

The form of the invention illustrated in Figs. 9 and 10 of the drawings is characterized by a pivot pin 20a in the form of a stud or trunnion integrally or permanently attached to the jaw A. In the particular construction illustrated in the drawings the pivot pin 20a has a reduced portion held in an opening 60 in the jaw member A and has its end riveted over as at 61. Instead of being provided with a separate bushing for pivotally carrying the jaw member B the pin 20a is provided with an integral bearing bushing enlargement 62. One end of this enlargement 62 bears against the inner side or surface 16a of the body member A. The pivot pin 20a formed and connected with the jaw member A as just described is rigidly and permanently fixed to the jaw member to operate as an integral part of the member.

The clippers illustrated in Figs. 9 and 10 of the drawings include a bearing member 11b similar to the bearing member 11a. The pin 20a passes through an opening 63 in the bearing member and a nut 64 is threaded on the outer end of the pin and clamps against the outer side of the bearing member. The bearing member 11b is thus tightly clamped against the outer end of the pin enlargement 62. The bearing member 11b in being tightly gripped or clamped between the nut 64 and the pin enlargement 62 is rigid with the pin and jaw member A and at all times moves with the jaw member A. The jaw member B swings or pivots on the enlarged part 62 of the pivot pin and is engaged and guided by the bearing member 11b and the part 16 of the jaw member A. The bearing member 11b presents a large bearing surface 25b on its inner side which is parallel with the surface 16a to effectively cooperate with the surface 26 of the jaw member B. The opposite surface 16b of the jaw member B bears against or cooperates with the surface 16a. The cooperation of the surfaces just mentioned constrains the jaw member B to pivot in the same plane as the member A and effectively resists any tendency of the jaw members to rock or tilt due to the cooperation of the cupped jaws C.

The bearing member 11b is provided with a stop 35b which projects forwardly over the blades or jaws C. The stop 35b may be identical with the stop 35a. Suitable stop shoulders 67 are provided to limit the relative pivotal movement between the jaw members A and B. The fruit clippers illustrated in Figs. 9 and 10 operate in the same manner as the previously described forms of the invention. The bearing member and stem engaging stop 11b is tightly clamped between the nut 64 and the pin enlargement 62 so that it is rigidly connected with the jaw member A. The jaw member A thus has spaced parallel bearing parts 16 and 11b of large extent between which the jaw member B swings or pivots. The relative pivotal movement between the jaw members in no way affects the pivotal connection and has no tendency to loosen the nut 64.

Having described only typical preferred forms and applications of my invention, I do not wish to be limited or restricted to the specific forms and applications herein set forth, but wish to reserve to myself any modifications or variations that may appear to those skilled in the art or fall within the scope of the following claims:

Having described my invention, I claim:

1. Fruit clippers including two members, jaws on the members adapted to cooperate to cut the stem of a fruit, a detachable pivot pin carried by one member to move therewith and passing freely through an opening in the other member, a bearing on the pin having one end bearing against the inner side of the first mentioned member and fitting said opening to support the said other member for pivotal movement, and a bearing member clamped against the other end of the bearing and having engagement with the first mentioned member to move with the first mentioned member and projecting forwardly over the jaws to position the stem of the fruit between the jaws.

2. Fruit clippers including, two members having broadened portions, longitudinally and transversely curved cutting jaws on the members, a detachable pivot pin engaged in an opening in one member to be movable with said member and freely extending through an opening in the broadened portion of the other member, a support on the pin having end thrust receiving cooperation with the inner side of the first named member and cooperating with said opening to support the said other member for pivotal movement, and a nut on the pin clamped against an end of the support to move with the pin and presenting a surface of substantially the same extent as the outer side of the broadened portion of said other member and cooperating with said outer side to constrain the members to pivot in a common plane, said nut projecting forwardly over the jaws to engage and position the stem of the fruit relative to the jaws.

3. In a device of the kind described, a pair of jaws, a pivot pin passing through said jaws and having a head on one end bearing against one jaw, said pin having a threaded end projecting through the second jaw, a bushing on said pin bearing against the inner side of the first jaw and projecting to a minute extent through the other jaw, a nut screwed on said pin to clamp said bushing, a lug formed on said nut and extending outwardly from the nut and a pair of lugs on the first jaw between which the first lug engages to hold the nut immovably to the first jaw.

4. In a device of the kind described, a pair of jaws, a pivot pin passing through said jaws and having a head on one end bearing against one jaw, said pin having a threaded end projecting through the second jaw, a bushing on said pin bearing against the inner side of the first jaw and projecting to a minute extent through the other jaw, a combined nut and gauge member having a nut portion and an integrally formed gauge portion, said pin being screwed in the nut with the gauge projecting forwardly along said jaws, said nut having a lug extending integrally therefrom, and a pair of lugs on the first jaw between which the first lug fits to hold the nut immovable with respect to the first jaw.

LEO M. HARVEY.